United States Patent [19]
Lubawy et al.

[11] Patent Number: 5,632,197
[45] Date of Patent: May 27, 1997

[54] COMMERCIAL COOKING VESSEL WITH IMPROVED HEAT TRANSFER

[76] Inventors: Kenneth C. Lubawy, 51343 Gee Ct., South Bend, Ind. 46628; Farshid Ahmady, 360 Essex Dr., Rochester Hills, Mich. 48307

[21] Appl. No.: 587,559

[22] Filed: Jan. 17, 1996

Related U.S. Application Data

[63] Continuation of Ser. No. 187,586, Jan. 26, 1994, abandoned.

[51] Int. Cl.⁶ ........................................ A47J 37/12
[52] U.S. Cl. ........................ 99/403; 99/408; 99/447; 99/DIG. 11; 126/391
[58] Field of Search ........................ 99/408, 403, 447, 99/451, DIG. 11; 126/391, 374, 376

[56] References Cited

U.S. PATENT DOCUMENTS

| | | | |
|---|---|---|---|
| 2,431,753 | 12/1947 | Holderle et al. | 126/391 |
| 2,655,944 | 10/1953 | Proehl | 138/38 |
| 2,712,308 | 7/1955 | Keating | 126/391 |
| 2,852,042 | 9/1958 | Lynn | 138/38 |
| 3,313,288 | 4/1967 | Aho | 126/391 |
| 3,769,959 | 11/1973 | Parker | 126/91 |
| 4,397,299 | 8/1983 | Taylor et al. | 99/403 |
| 4,412,558 | 11/1983 | Burke et al. | 138/38 |
| 4,602,612 | 7/1986 | Schwizer | 99/403 |
| 4,628,903 | 12/1986 | Farnsworth et al. | 126/391 |
| 4,690,127 | 9/1987 | Sank | 126/391 |
| 4,848,317 | 7/1989 | Prudhomme et al. | 99/403 |
| 4,848,318 | 7/1989 | Brewer | 126/390 |
| 4,858,592 | 8/1989 | Hayek et al. | 126/373 |
| 4,895,137 | 1/1990 | Jones et al. | 126/391 |
| 4,898,151 | 2/1990 | Luebke et al. | 99/403 |
| 4,905,664 | 3/1990 | Dunham | 126/391 |
| 4,913,041 | 4/1990 | Taber et al. | 99/403 |
| 4,913,042 | 4/1990 | Miller | 99/408 |
| 4,976,609 | 12/1990 | Grob et al. | 431/326 |
| 5,033,368 | 7/1991 | Brewer | 99/403 |
| 5,050,582 | 9/1991 | Almond et al. | 126/391 |
| 5,101,806 | 4/1992 | Hunt et al. | 126/391 |
| 5,184,539 | 2/1993 | Oiwa | 99/408 |
| 5,209,218 | 5/1993 | Daneshvar et al. | 99/403 |
| 5,355,776 | 10/1994 | Driskill | 99/408 |

*Primary Examiner*—David Scherbel
*Assistant Examiner*—James F. Hook
*Attorney, Agent, or Firm*—Nicholas A. Camasto

[57] ABSTRACT

A deep fat fryer includes three horizontally aligned heat tubes surrounded by cooking oil in a cooking vessel. An infrared type combustion burner is in each of the two outer tubes and combustion products therefrom are directed along separate paths back and forth through the center tube. The center tube includes a divider, having a zig-zag metal baffle mounted on each side, that forms an upper and lower passage in the tube. A blower forces air to the burners and combustion products from the outer tubes flow over the baffles in the passages of the center tube and out a flue via a divided, insulated plenum.

11 Claims, 4 Drawing Sheets

COMMERCIAL COOKING VESSEL WITH IMPROVED HEAT TRANSFER

This is a continuation of application Ser. No. 08/187,586, filed on Jan. 26, 1994, now abandoned.

BACKGROUND OF THE INVENTION AND PRIOR ART

This invention relates generally to commercial cooking vessels, such as deep fat fryers and pasta cookers and particularly to cooking vessels in which the heat transfer from the combustion products to the cooking medium (oil or water) is enhanced. While the invention is described in connection with a deep fat fryer, the teachings and claims should not be restricted thereto.

Commercial deep fat frying equipment, for cooking foodstuffs such as french fries, chicken and the like, generally use gas or electricity as the heat source. In equipment that uses gas as a heat source, the gas burners are positioned in one or more heat tubes that are situated in the cooking vessel or pot and which are immersed in, or otherwise in intimate thermal contact with, the cooking oil. The combustion products from the burners are exhausted or vented by conventional means to a flue or exhaust. More recently infrared (IR) type gas burners have been used. Such burners include a ceramic material that is heated by the forced flow of a mixture of air and gas to very high temperatures which produces heat transfer by radiation, as well as by conduction and convection of the combustion products through the heat tube. It has been found that with the invention, a three burner-three tube deep fat fryer may be operated with better results with only two burners.

In accordance with the preferred embodiment of the invention, the combustion products from the two burners are directed by a divided, insulated plenum through the bottom section of a divided center tube, back through the top section of the center tube, to the insulated plenum and exhausted to a flue. The center tube is fitted with a baffle device consisting of a divider plate that separates the tube into top and bottom sections (in communication with respective portions of the insulated plenum) and a pair of zig-zag metal strips or baffles, attached to opposite sides of the divider plate, for disrupting the laminar flow of the combustion products and enhancing heat transfer to the tube walls (and to the cooking oil) and minimizing heat loss through the flues.

OBJECTS OF THE INVENTION

A principal object of the invention is to provide an improved commercial cooking vessel.

Another object of the invention is to provide a commercial cooking vessel that enhances heat transfer from the combustion burners to the cooking medium.

A further object of the invention is to provide a commercial cooking vessel that is highly efficient in operation.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
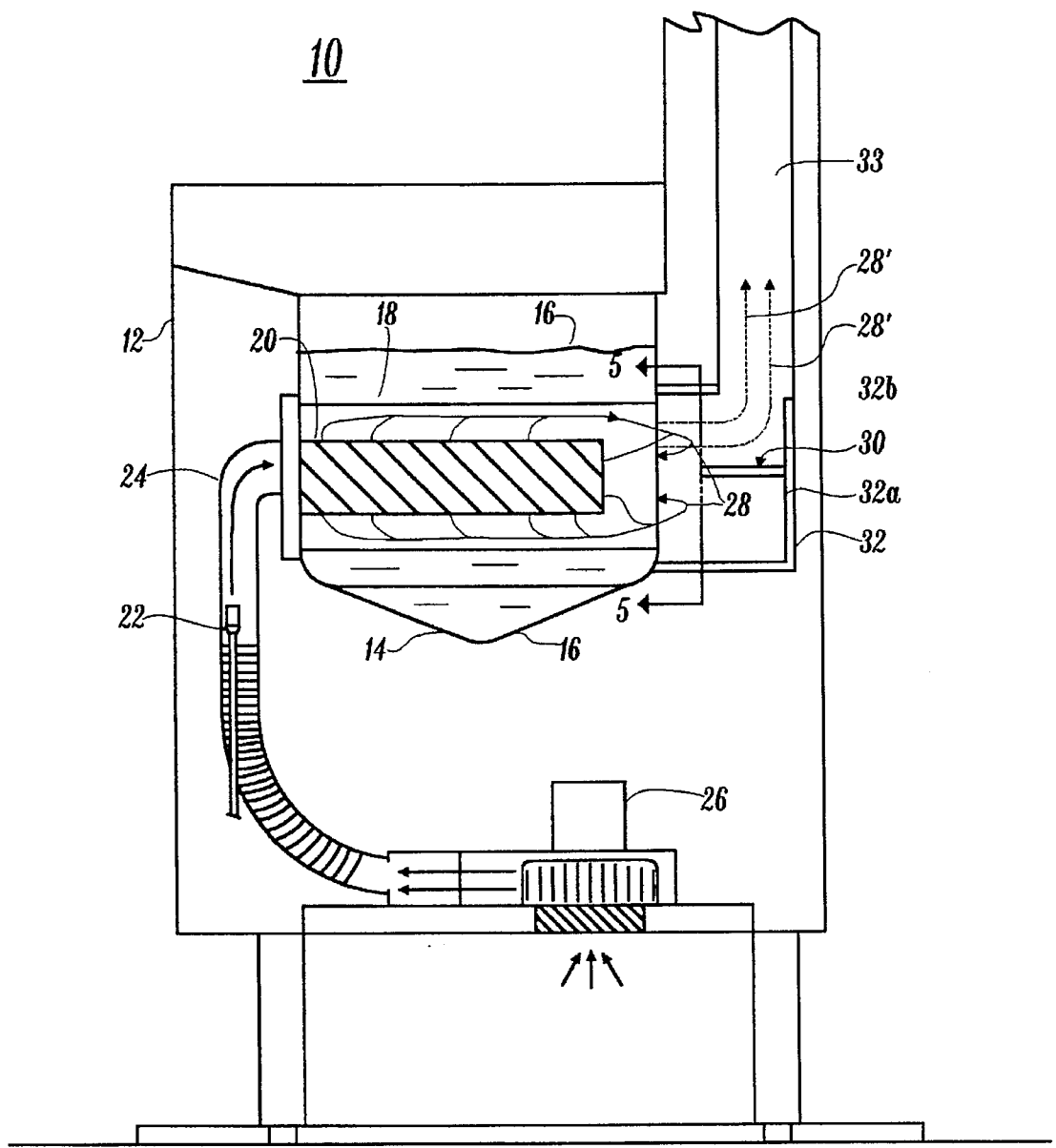
FIG. 1 is a generalized cross section of a deep fat fryer constructed in accordance with the invention.

Referring to FIG. 1, a deep fat fryer 10 is shown in cross section. Fryer 10 comprises a housing 12 of stainless steel or the like which defines an interior pot or vessel 14 for holding a quantity of cooking oil 16 for deep frying foodstuffs (not shown). Three heat tubes, one of which (an end tube 18) is illustrated in the Figure, traverse vessel 14 and are immersed in the cooking oil 16. The two end tubes each include an IR gas burner 20 for burning a mixture of gas and air in accordance with well known principles. The gas is conveyed via a gas jet 22 that communicates with an air tube 24 in which air is forcibly moved by a blower 26. The air flow is indicated by the arrowed lines 28. A baffle arrangement 30 in a divided, insulated plenum 32, which communicates with a flue 33, is partially shown. The flow lines 28 indicate that the combustion products of IR burner 20 flow into the bottom or lower section 32a of plenum 32. The arrowed lines 28' extending from the upper section 32b of plenum 32 into flue 33 indicate that the combustion products are exhausted from upper section 32b of the plenum.

Figure 3:
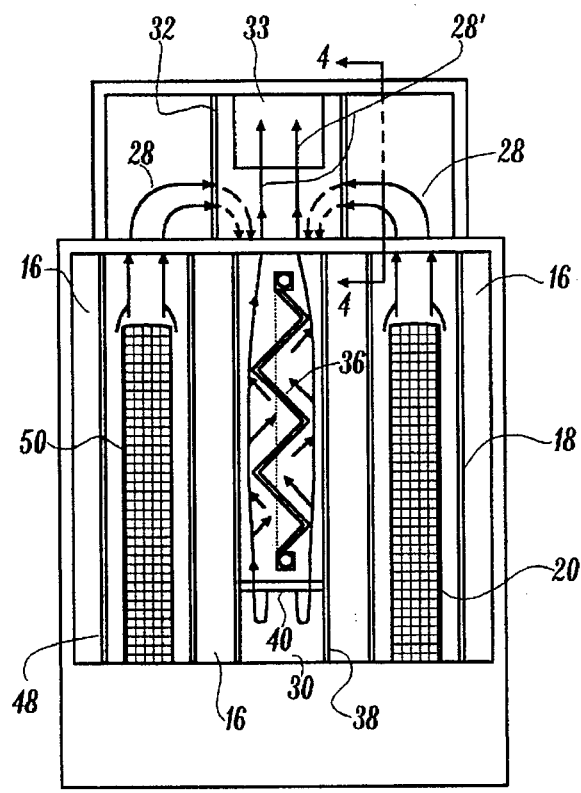
FIG. 3 is a top sectional view showing the arrangement of the three heat tubes in the cooking vessel.
Figure 2:
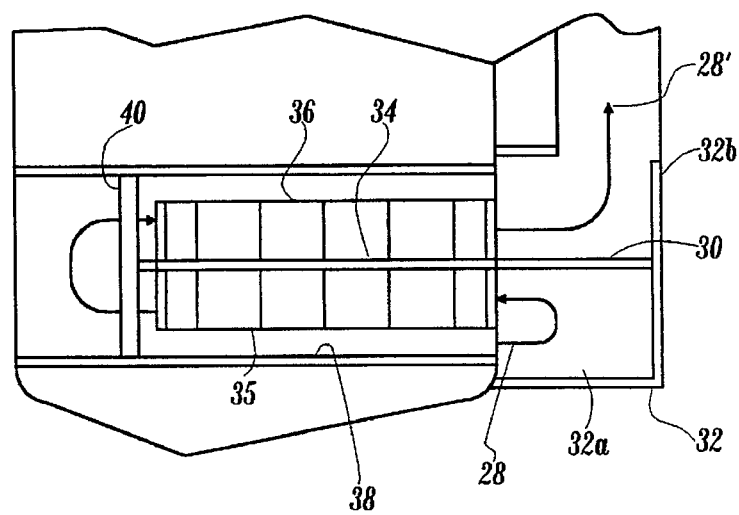
FIG. 2 is a partial sectional view of the center tube and baffle arrangement of the invention.

It will be appreciated that the two outer heat tubes of a three heat tube fryer assembly each include an IR burner as shown in the sectional view of FIG. 3. The FIG. 2 view cross section of the center tube should be considered in connection with FIG. 3 for a better understanding of the flow pattern of the combustion products in accordance with the invention. The baffle arrangement 30 includes a generally elliptical support ring 40 affixed to a generally flat divider plate 34 of relatively thick metal. A top or upper baffle 36 is secured to the upper surface of divider plate 34 and a bottom or lower baffle 35 is secured to the lower surface of divider plate 34. Both baffles are of zig-zag shaped metal and are secured by means of bolts (or by welding) to divider plate 34. The outer tubes 18 and 48 are heated by radiation from IR burners 20 and 50 and by the combustion products therefrom. The heating tubes, which are immersed in the cooking oil 16, transfer heat to the cooking oil.

The flue 33 is connected to the upper section 32b of the plenum 32 and is vented to the atmosphere. As illustrated by the arrowed lines 28 and 28', the combustion products from each of the IR burners 20 and 50 are combined in the lower section 32a of plenum 32, forced over the lower baffle 35 in the lower section of the center tube 38, back over the upper baffle 36 in the upper section of the center tube 38 into the upper section 32b of the plenum 32 and out the flue 33. The divider plate 34 cooperates with an isolating portion 32c of the plenum 32 (which divides the plenum into two sections) to force this pattern of combustion product travel (see FIG. 5). The support ring 40 is configured to match the inner shape of center tube 38 and thus securely supports the baffle arrangement 30 therein. The far end of divider plate 34 includes an aperture 37 for securing the divider plate to isolating 32c of plenum 32. While the combustion product flow is forced by the blower 26 which pressurizes the air and gas mixture, the invention is not dependent upon the use of a blower.

Figure 5:
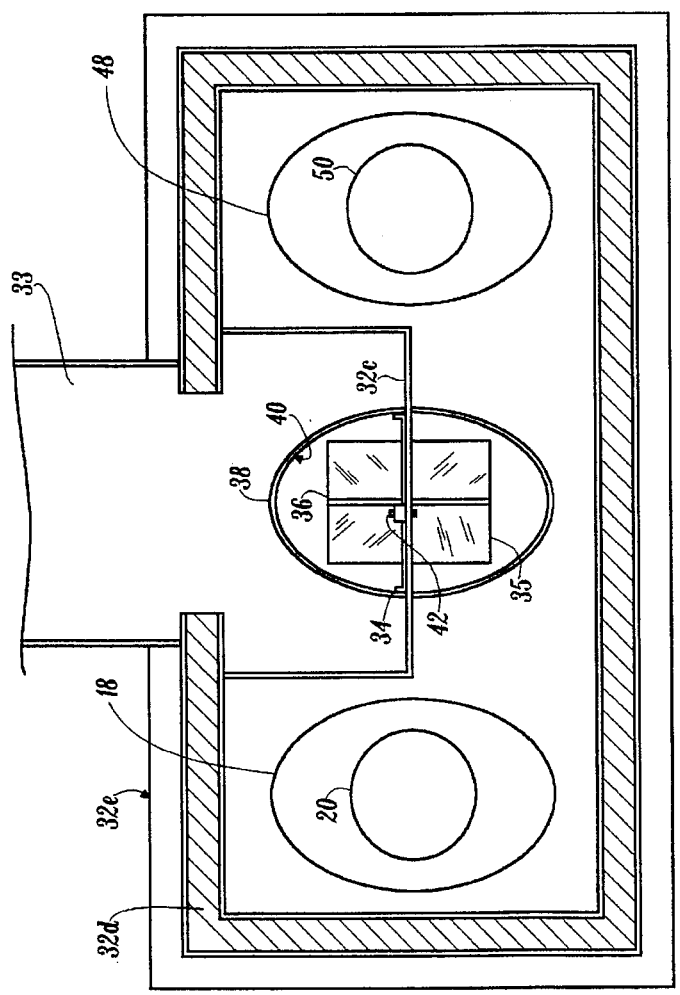
FIG. 5 is an end partial end view of the flue box taken along the line 5—5 of FIG. 1.
Figure 4:
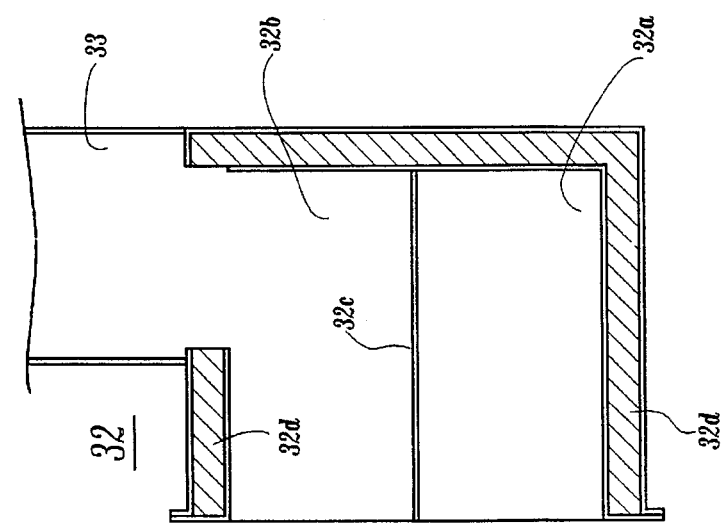
FIG. 4 is a partial side view of the flue box taken along the line 4—4 of FIG. 3.

FIGS. 4 and 5 are side and end sectional views of the plenum 32 showing the construction of isolation portion 32c. The plenum flange 32e that is secured by any suitable means, such as spot welding, to the end wall of vessel 14 and thus the ends of the three heat tubes 18, 38 and 48 are visible. As mentioned, the divider plate 34 of baffle arrangement 30 is secured to the bottom wall of isolating portion 32c of plenum 32 and, in conjunction with the support ring 40, secures baffle arrangement 30 in center tube 38. The positioning of the zig-zag shaped upper and lower baffles 35 and 36 is clearly illustrated in FIG. 5. The plenum includes suitable insulation 32d to enhance the efficiency of heat transfer to the cooking vessel.

Figure 6:
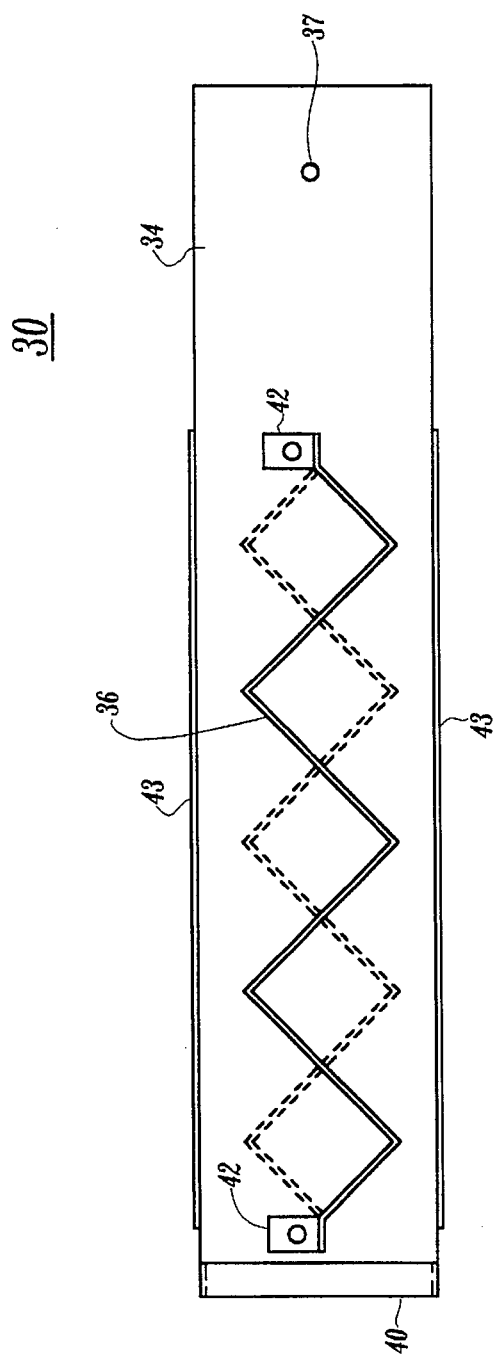
FIG. 6 is a top view of the baffle arrangement of the invention.
Figure 7:
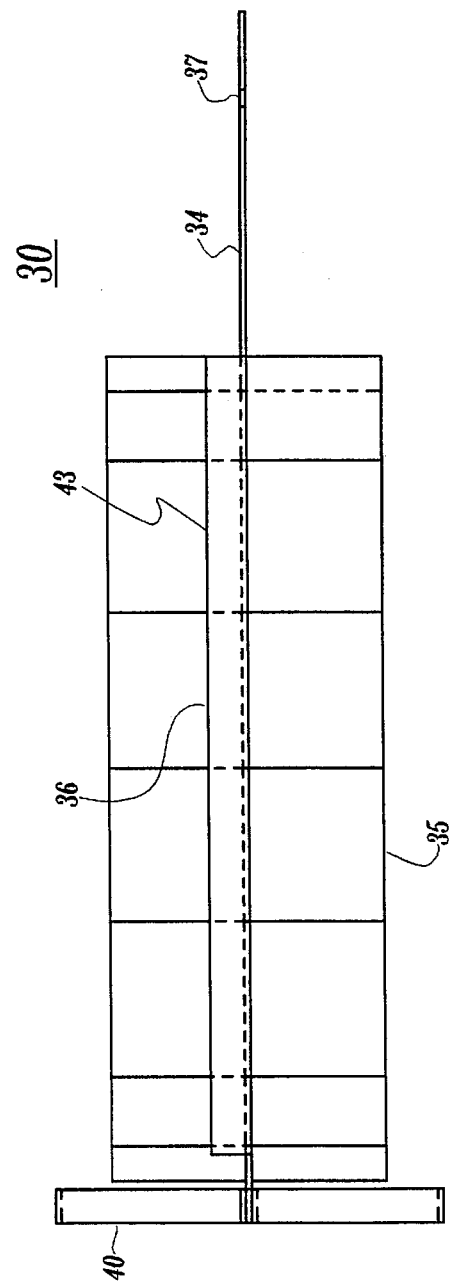
FIG. 7 is a side view of the baffle arrangement of FIG. 6.

In FIGS. 6 and 7, the baffle arrangement 30 shows upper baffle 36 and lower baffle 35 and the mounting tabs 42 for attachment of the baffles to the opposite sides of divider plate 34. The support ring 40 fits snugly within the center tube and is attached to divider plate 34 by any suitable means, spot welding being preferred. The upper and lower baffles are seen to have identical zig-zag shapes. As mentioned, the baffles 35 and 36 and divider plate 34 are of heavy metal construction. Divider plate 34 has a pair of upturned flanges 43 for stabilizing the baffle arrangement 30 in center tube 38.

What has been described is an improved tube type deep fat fryer in which the combustion products travel from conventional burner tubes through a novel baffled heat exchange tube communicating with an insulated plenum before being exhausted out a flue. The combustion products, therefore, contact a greater surface area and spend a greater amount of time within the cooking vessel thereby transferring more thermal energy than otherwise possible for an identical size fryer. Advantages to this invention include reduced fuel input for a given production rate as well as lower flue temperatures. Extensive testing has shown that input rates on the order of 40% lower with 300° F. lower flue temperatures are attainable in a conventional sized three tube fryer of this design versus the standard three burner (no recirculating tube) design.

As mentioned above, the cooking vessel may also be used for boiling foods, such as pasta, in which case the cooking medium will be water rather than oil. It is also noted that the number of heat tubes in the vessel or pot needn't be restricted to the three shown and described. Systems with four or more such tubes are envisioned with at least one of the tubes being constructed with dividers and baffles as described above.

It is thus recognized that numerous changes in the described embodiment of the invention will be apparent to those skilled in the art without departing from its true spirit and scope. The invention is to be limited only as defined in the claims.

What is claimed is:

1. In combination in a commercial cooking vessel:
   a pot for holding a cooking medium;
   three horizontally aligned separate heat tubes in said pot, each substantially fully surrounded by said cooking medium;
   an infrared combustion burner in each of the outer ones of said three heat tubes;
   flue means coupled to the middle one of said three heat tubes for venting combustion products from said combustion burners;
   said middle one of said heat tubes receiving the combustion products from each of said outer ones of said heat tubes and passing said combustion products to said flue means; and
   means in said middle one of said heat tubes for enhancing heat transfer from said combustion products to said cooking medium, said enhancing means comprising a divider in said middle one of said heat tubes, and baffles on each side of said divider for disrupting the laminar flow and lengthening the path of travel of said combustion products.

2. The combination of claim 1 wherein said baffles are zig-zag shaped.

3. The combination of claim 2 wherein said enhancing means further comprise an insulated plenum in said flue means in communication with said heat tubes.

4. The combination of claim 3, further including:
   blower means for supplying air to said combustion burners.

5. In combination in a deep fat fryer:
   a vessel for holding cooking oil or the like;
   first, second and third separate heat tubes in said vessel in substantially full thermal communication with said cooking oil;
   a combustion burner in each of said first and second heat tubes;
   an insulated plenum having first and second sections coupled to said heat tubes;
   a flue for venting combustion products from said combustion burners coupled to said section of said plenum; and
   said third heat tube receiving the combustion products from said first and said second heat tubes via said first section of said plenum and conveying said combustion products to said flue via said second section of said plenum.

6. The combination of claim 5 in which said third heat tube includes means for additionally enhancing heat transfer from said combustion products to said cooking oil.

7. The combination of claim 6 wherein said additionally enhancing means comprises a divider forming two sections in said third heat tube and lengthening the path of travel of said combustion products in said third heat tube.

8. The combination of claim 7, further including baffle means in each of said two sections of said third heat tube that disrupts the laminar flow of said combustion products.

9. The combination of claim 8 wherein said baffles are zig-zag shaped.

10. The combination of claim 9 wherein said combustion burners are infrared burners and further including blower means for supplying air to said infrared burners.

11. The combination of claim 10, wherein said first, second and third heat tubes lie in a horizontal plane.

* * * * *